United States Patent
Fischer et al.

[11] 3,883,711
[45] May 13, 1975

[54] METHOD AND APPARATUS FOR FORMING TRANSVERSE WELDED SEAMS BETWEEN VERTICALLY ORIENTED WORKPIECES

[75] Inventors: Hans Fischer, Nurnberg; Herbert Hellendrung, Oberhausen, both of Germany

[73] Assignee: Gutehoffnungshutte Sterkrade Akt., Germany

[22] Filed: July 2, 1973

[21] Appl. No.: 375,868

Related U.S. Application Data
[62] Division of Ser. No. 267,046, June 28, 1972, Pat. No. 3,777,105.

[30] Foreign Application Priority Data
June 29, 1971 Germany.......................... 2132143

[52] U.S. Cl.................................. 219/73; 219/126
[51] Int. Cl............................................. B23k 9/18
[58] Field of Search ....... 219/73, 126, 76, 130, 137, 219/136

[56] References Cited
UNITED STATES PATENTS

| | | | |
|---|---|---|---|
| 2,277,654 | 3/1942 | Merlub-Sobel et al. | 219/76 X |
| 2,434,481 | 1/1948 | Anderson | 219/136 |
| 2,678,987 | 5/1954 | Talley | 219/126 |
| 2,810,063 | 10/1957 | Brashear, Jr. | 219/130 |
| 3,071,678 | 1/1963 | Neely et al. | 219/76 |
| 3,415,975 | 12/1968 | Johnson | 219/73 X |
| 3,493,713 | 2/1970 | Johnson | 219/73 X |

*Primary Examiner*—J. V. Truhe
*Assistant Examiner*—Clifford C. Shaw
*Attorney, Agent, or Firm*—McGlew and Tuttle

[57] ABSTRACT

The welded seams are formed between facing edges of vertically oriented plate sections by submerged arc welding. The bottom edge of an upper section is formed with intersecting bevelled faces defining a V-shape nose in cross-section, and the upper edge of a lower thick plate section is formed with intersecting sloping faces defining a V-shape upwardly opening notch in cross-section. The sections are placed with the apices of the V-shaped cross-sections in substantial alignment vertically to define opposite facing welding grooves having a common welding groove root. The faces defining the welding grooves are arranged at angles such that the welding groove sides diverge outwardly and upwardly from the root. Molten weld metal is progressively deposited along the welding grooves by submerged arc welding while the welding powder is supplied to the grooves both before and behind the pool of molten weld metal. The apparatus includes a welding wire feed guide, contact jaws for conducting current to the welding wire, a conductor for connecting the contact jaws to a source of welding current, and a powder feed pipe in the form of an inverted Y which is fixedly connected with the welding wire feed device. The outlet openings of the powder feed pipe are arranged, respectively, before and behind the contact jaws in the direction of weld formation. A pressure gas may be supplied to the powder feed pipe in advance of the Y junction.

2 Claims, 2 Drawing Figures

3,883,711

METHOD AND APPARATUS FOR FORMING TRANSVERSE WELDED SEAMS BETWEEN VERTICALLY ORIENTED WORKPIECES

This is a division of application Ser. No. 267,046, filed June 28, 1972, now U.S. Pat. No. 3,777,105.

FIELD AND BACKGROUND OF THE INVENTION

This invention relates to apparatus for the formation of welded seams extending in a transverse direction, between thick plate cross-sections, particularly when joining metal tank sections and forged rings utilizing the submerged arc welding procedure.

Heavy apparatus and pressure tanks, for example, reactor vessels, frequently are of such size that they must be initially formed of several components which must be transported, as single parts, to the construction site, because of their great weight and large dimensions. When the individual sections are assembled and welded to form tanks, it is frequently necessary, on the construction site because of lack of space, to effect submerged arc welding operations in the transverse position.

Heretofore, such welding operations have been carried out using only manual electrodes, particularly on thick alloyed plates such as tank sections and forged rings. However, this is uneconomical in view of modern welding methods, such as submerged arc welding or shielded arc welding.

The disadvantages of the present manual welding are substantially low output and poor quality of the welded material, for example, slag inclusions, pore formation, and crater cracks, and bonding defects at the flanks of the seams.

SUMMARY OF THE INVENTION

The objective of the present invention is to provide a welding apparatus permitting welding utilizing the submerged welding procedure for the formation of transversely extending welded seams, that is seams which extend in a direction which is perpendicular to the axis of a tank, of tank sections, or of forged rings, even in the case of thick alloyed plates, and which avoid the above-mentioned disadvantages.

In accordance with the invention, this problem is solved by producing a welding groove form at the facing plate edges, with the lower surfaces of the welding groove form sloping inwardly and downwardly toward each other to define a V-shape notch in cross-section. The welding powder is supplied or deposited both before and behind the welding pool, if necessary by using a gas under pressure. Advantageously, the angles of the sloping edge portions defining the welding groove have a value of 12°–30°.

In accordance with the invention, the apparatus for performing the invention includes a powder feed pipe in the form of a Y-pipe, with diverging outlet ends, supported on the guide for the welding wire, the outlets of the powder feed pipe being arranged before and behind the lower end of the welding wire guide. A special advantage of the invention is the provision of a pressure gas supply connected to the powder feed pipe at a point before the outlet ends of the pipe diverge from each other.

Another object of the invention is to provide an improved apparatus for performing the method.

A further object of the invention is to provide such an method and apparatus utilizing the submerged arc welding procedure.

For an understanding of the principles of the invention, reference is made to the following description of a typical embodiment thereof as illustrated in the accompanying drawings.

DESCRIPTION OF THE PREFERRED EMBODIMENT

Figure 1:
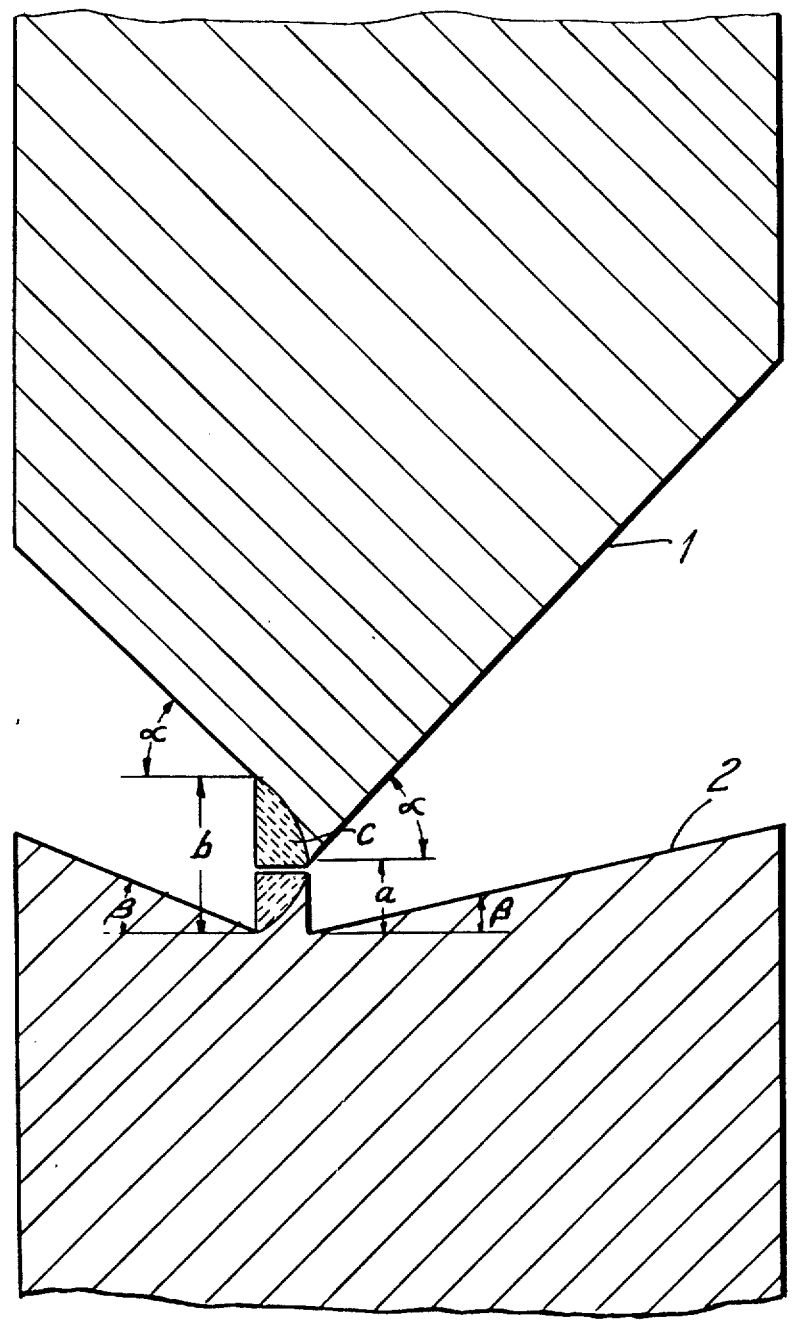
FIG. 1 is a cross-sectional view of the seam form in accordance with the invention.

Referring to FIG. 1, which shows the seam form in accordance with the invention and which permits weld uniting plates with a thickness of 200mm and more, as well as forged rings with a thickness of 300mm and more, by the submerged arc welding with transversely extending seams, it will be noted that, in order to obtain a good accessibility for the welding apparatus and for the welding wire, as well as for the powder feed, the upper edge 1 of the seam has an aperture angle $\alpha$ of 45°. The root width $a$ on the side of the larger groove portion is about 20mm. It will be noted that the lower edge 1 of the upper workpiece is formed with intersecting bevelled faces defining a V-shape, downwardly facing nose in cross-section.

The upper edge 2 of the lower workpiece is formed with intersecting sloping faces defining a V-shape upwardly opening notch in cross-section, these faces extending at angles between 25° and 12° to the horizontal, so that the pouring and holding of the welding powder is facilitated. The magnitude of the aperture angle $\alpha$, the magnitude of the roof width $a$, and the angle $\beta$ of the faces of the upper edge of the lower workpiece provide a very favorable ratio between a very small welding volume and a minimum cutting volume. This is of paramount importance for the economy of the welding, particularly when welding transverse seams.

The root width $a$ of the deeper welding groove, to the right in FIG. 1, corresponds to the root width $b$ of the shallower welding groove, to the left in FIG. 1. In contrast to the root width $a$, the magnitude of the root width $b$ has been selected to be 10mm higher in order to obtain, after filling the deeper weld groove, to the right in FIG. 1, with deposited weld metal, a better accessibility to remove, for example, the unwelded seam root $c$ by planing or grinding. It will be noted that, in effect, the apieces of the two V-shape sections, namely the nose and the notch, are substantially aligned vertically, although possibly offset a little bit relative to each other.

Figure 2:
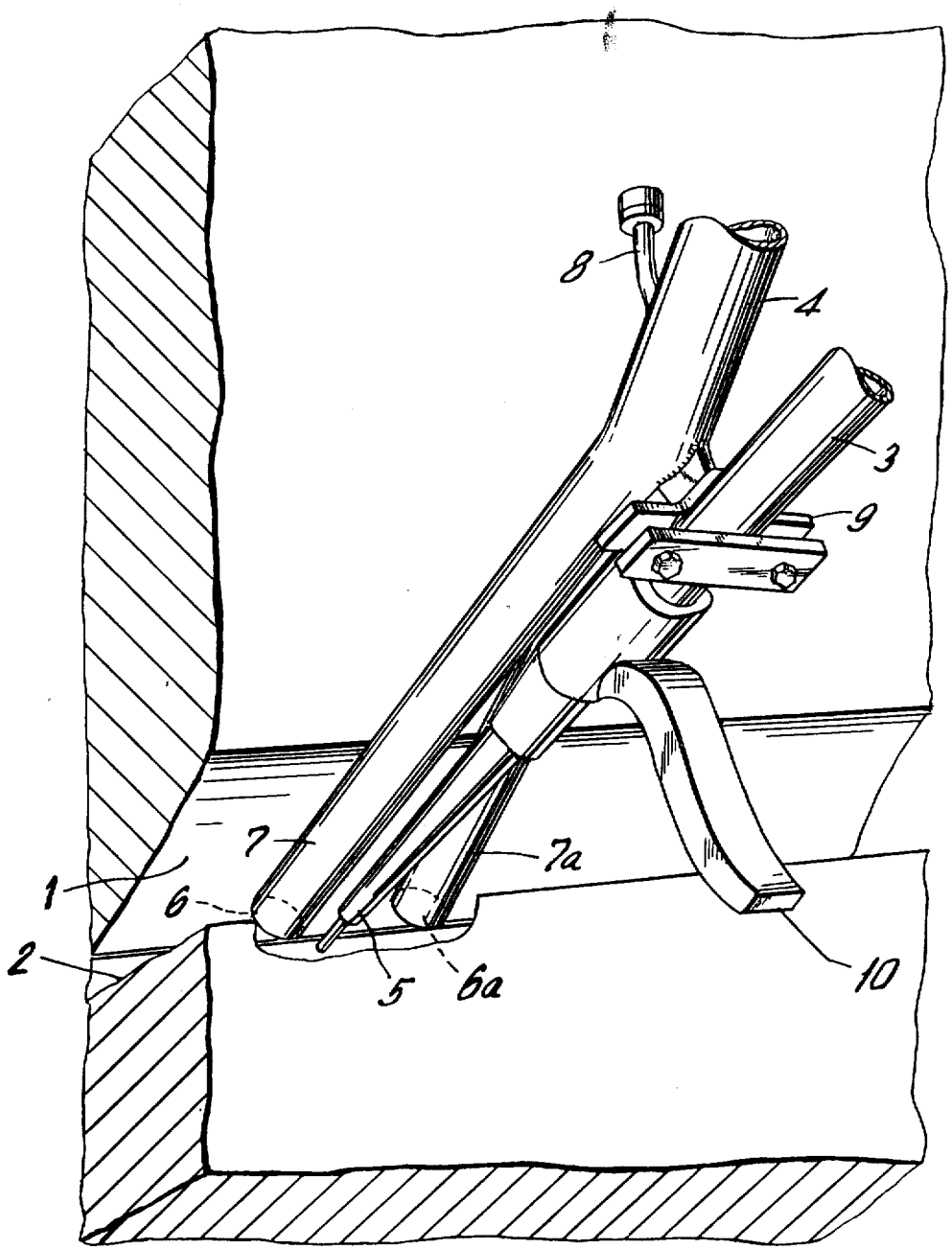
FIG. 2 is a perspective view of the apparatus embodying the invention.

The apparatus of the invention is shown in FIG. 2. The welding powder feed pipe 4 having downwardly diverging legs 7 and 7a communicating therewith, is connected rigidly with the wire feed guide 3, and is so arranged that the welding powder is supplied in sufficient quantities both before and behind the welding pool or welding point, even with normal weights of the powder charge. This is particularly true for welding on the upper welding groove edge, where the welding powder, pushed away by the current contact jaws or nozzle 5, which is missing in the supply range, is supplemented through the second outlet opening 6a of the Y-pipe 7. The Y-shaped powder supply pipe 4 is eliptic in the range of the outlet openings 6, 6a, with the longer diameters of the ellipses extending in the welding direction and with the smaller diameters of the ellipses corresponding to the diameter of the current nozzle or jaws 5. By virtue of this, a reduction of the radius of action in the seam joint can be avoided, and an optimal height of the powder charge can be maintained, which is absolutely necessary for a pour-free and slag-free welded joint.

In order to ensure a uniform powder covering, even at shallower pouring angles in the upper and deeper seam regions, the powder feed is effected with carbon dioxide gas under pressure. The gas supply pipe is indicated at 8, and communicates with the powder feed pipe 4 above the point of diverging of the discharge legs of the latter.

All metallic components of the powder feeding means are formed of non-magnetic material, so that the magnetic field, existing during welding in deep seam joints, cannot have any adverse effect on the pouring behavior of the welding powder. Powder feed pipe 4 is displaceably mounted, by means of a holder 9, on the insulated or dielectric welding wire feed guide 3. The contact jaws or current nozzle 5 are arranged in the same plane as the outlet openings 6 and 6a of pipe 4, and between these outlet openings. The welding current supply line for the entire apparatus is indicated at 10.

While a specific embodiment of the invention has been shown and described in detail to illustrate the application of the principles of the invention, it will be understood that the invention may be embodied otherwise without departing from such principles.

What is claimed is:

1. Apparatus for forming transversely extending welded seams between facing edges of vertically oriented thick plate sections, by submerged arc welding, in which the upper edge of a lower plate section is formed with a longitudinally extending V-groove and the facing lower edge of an upper plate section is formed with intersecting bevelled faces extending longitudinally thereof defining a V shape nose with the apex angle of the nose being substantially smaller than the apex angle of the facing groove to provide oppositely facing elongated welding grooves having upper and lower faces sloping upwardly and diverging outwardly of the plate sections, said apparatus comprising, in combination, welding wire feed means operable to guide a welding wire downwardly and laterally inwardly into the welding groove, and including a wire feed nozzle projectable into the groove; means engaging the welding wire fed by the wire feed means to supply welding current thereto; a welding powder feed pipe fixedly connected to said welding wire feed means; said welding powder feed pipe being in the form of a Y-pipe including a downwardly and laterally inwardly extending stem and downwardly diverging leading and trailing legs communicating with said steam and dimensioned to project into the welding groove, and each having a powder discharge opening at its lower end; said powder discharge openings being arranged before and behind said wire feed nozzle in the direction of movement of said welding apparatus along the welding groove and substantially in alignment with said wire feed nozzle; clamp means secured to said welding powder feed pipe and embracing said welding wire feed means for adjustment of said welding powder feed pipe longitudinally of said welding wire feed means; and means communicating with the stem of said powder feed pipe upstream of the diverging legs thereof and operable to supply a gas under pressure to the welding powder in said pipe; said powder discharge openings being elliptical with the major axes of the ellipses extending in the welding direction and their minor axes being equal to the diameter of the wire feed nozzle; said powder feed pipe being formed of a non-magnetizable metal; said leading leg supplying welding powder into the welding groove in advance of said wire feed nozzle, and said trailing leg supplying welding powder into the groove behind said wire feed nozzle to replenish the welding powder removed by said wire feed nozzle.

2. Apparatus for forming transversely extending welded seams, as claimed in claim 1, in which said non-magnetizable metal is a non-magnetizable nickel alloy.

* * * * *